United States Patent [19]

Daido et al.

[11] 4,218,982
[45] Aug. 26, 1980

[54] PATTERN GENERATING SYSTEM FOR USE IN ELECTRONIC SEWING MACHINES

[75] Inventors: Toshihiko Daido, Nara; Hiroshi Kunimatsu, Osaka, both of Japan

[73] Assignees: Koyo Seiko Company Limited; Koyo Machine Industries Company Limited, both of Osaka, Japan

[21] Appl. No.: 968,366

[22] Filed: Dec. 11, 1978

[30] Foreign Application Priority Data

Jun. 19, 1978 [JP] Japan .................. 53-74390

[51] Int. Cl.$^2$ .............................................. D05B 3/02
[52] U.S. Cl. .................................................. 112/158 E
[58] Field of Search .......... 112/158 E, 121.11, 121.12; 318/567, 569

[56] References Cited

U.S. PATENT DOCUMENTS

| | | | |
|---|---|---|---|
| 4,051,794 | 10/1977 | Herzer et al. | 112/121.12 |
| 4,086,862 | 5/1978 | Makabe et al. | 112/121.11 X |
| 4,122,786 | 10/1978 | Tanimoto et al. | 112/158 E |
| 4,142,473 | 3/1979 | Itoh | 112/158 E |

*Primary Examiner*—Peter P. Nerbun
*Attorney, Agent, or Firm*—Mason, Fenwick & Lawrence

[57] ABSTRACT

A pattern generating system for use in electronic sewing machines. Output-oriented data relating to the amount of bight or feed for a stitch pattern and order instruction-oriented data relating to the order in which the output-oriented data is read out are stored in a static memory (ROM) separately in such a manner as to distinguish between the data relating to bight and the data relating to feed. The data relating to the address at which the respective head data on stitch patterns is stored is stored at specified addresses in the static memory addressed by selection instructions corresponding to the stitch patterns given as by a pattern selecting button unit. The static memory is connected to a microcomputer which performs a control operation such that it indexes the static memory, analyzes order instruction-oriented data and updates addresses or gives the output-oriented data to a drive unit which controls the amount and direction of bight and feed. The connection of the static memory to the microcomputer is such that the static memory can be exchanged with another static memory having stored therein data relating to other different stitch patterns.

1 Claim, 14 Drawing Figures

PATTERN GENERATING SYSTEM FOR USE IN ELECTRONIC SEWING MACHINES

BACKGROUND OF THE INVENTION

The present invention relates to a pattern generating system for use in electronic sewing machines, which is designed to store data relating to the bight movement of the needle and to the feed movement of the feed dog in a static memory and read out said data in timed relation to the rotation of the main shaft of the sewing machine, said data thus read out from said static memory being given to a drive unit which controls the amount and direction of said bight and feed, thereby enabling pattern stitching to be carried out.

The applicants have previously provided a pattern signal generating system for electronic sewing machines, in Japanese Patent Application No. 149614/1977, wherein the bight data relating to the bight movement of the needle and the feed data relating to the feed movement of the feed dog are separately stored in a static memory, said bight date or feed data being composed of output-oriented data relating to the amount of bight or feed and order instruction-oriented data relating to the order in which said output-oriented data is read out, the arrangement being such that the bight data and feed data for forming a predetermined stitch pattern can be read out in a predetermined order in timed relation to the bight and feed movements. In said prior system, however, the relation between said static memory for storing bight data and feed data and the control system is such that with respect to a particular program stored in the static memory, a particular control system line for giving an instruction to read out said program is specified. Thus, the programs stored in the static memory are in inseparable relation to the control system lines.

SUMMARY OF THE INVENTION

The present invention has for its object the provision of a pattern generating system for use in electronic sewing machines, wherein, in contrast to said prior system, the static memory is made independent of the control system, so that several static memories in which different programs are stored can be exchangeably mounted so as to provide the same exchange function as that of the exchange cam type selection means employed in a conventional sewing machine designed to mechanically perform pattern stitching.

DESCRIPTION OF THE PREFERRED EMBODIMENTS

Figure 1:
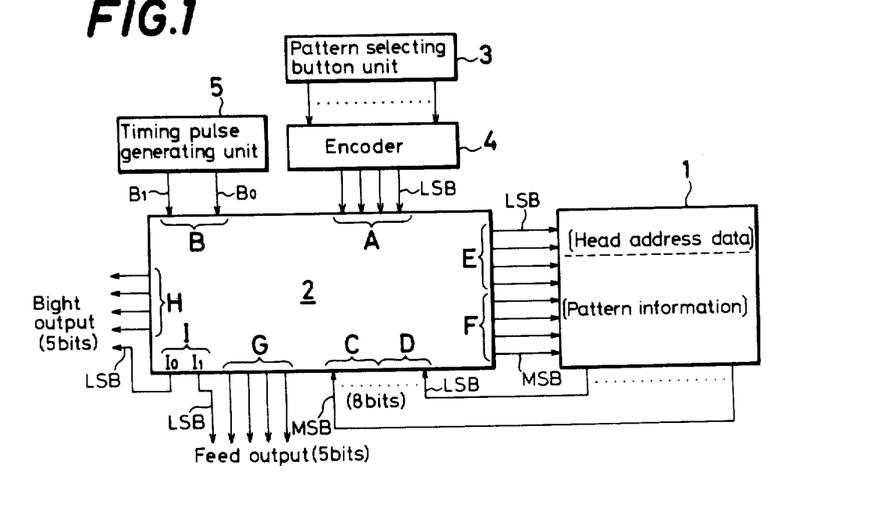
FIG. 1 is a block diagram illustrating an embodiment of the invention.

An embodiment of the invention will now be described. In FIG. 1, the reference character 1 designates a static memory composed of a read-only memory called ROM for short and adapted to store a plurality of different pieces of information relating to pattern stitching including straight stitching. The head address data for individual pattern programs to be stored in said static memory 1 is stored in the head area of said memory and the data relating to individual patterns is stored in the subsequent areas. The pattern information is not a combination of bight-oriented data and feed-oriented data but comprises output-oriented data, which is bight-oriented data for specifying the displacement of the needle or feed-oriented data for specifying the feed of the feed dog, and order instruction data relating to control instructions for the output order in which said output-oriented data is transferred, not including the data relating to the displacement of the needle or the feed of the feed dog. It is to be noted, however, that the said storing of the head address data for individual pattern programs in the head area of the static memory 1 is for the purpose of facilitating the preparation of pattern programs but that it is not always necessary to adopt such storage order.

In this embodiment of the invention, one piece of data is composed of 8 bits and said output-oriented data has its highest bit represented by (0) so as to indicate that said data is output-oriented data, and predetermined several bits included in the remaining lower 7-bit portion (in this embodiment, 5 bits in the lower position) are alloted for substantial pattern information relating to the displacement of the needle or the feed of the feed dog. The higher 3-bit portion of said order instruction data is (100), (101), (110) or (111), each indicating a different order instruction, the remaining lower 5-bit portion being auxiliary data attendant on the particular order data, as will be described later in more detail.

On the other hand, the control system for reading out a pattern program stored in said static memory 1 in response to a predetermined instruction employs a low class microcomputer 2 in its principal part for cost saving purposes, said microcomputer being capable of receiving or sending out only a 4-bit signal at a time. The RAM of said microcomputer 2 has the following areas set therein.

(1) Bight-oriented higher position data register B-$DATA_h$.

An area for temporarily storing the higher 4-bit portion of pattern information relating to bight and read out from said static memory 1.

(2) Bight-oriented lower position data register B-DATA$_l$.

An area for temporarily storing the lower 4-bit portion of pattern information relating to bight and read out from said static memory 1.

(3) Feed-oriented higher position data register F-DATA$_h$.

An area for temporarily storing the higher 4-bit portion of pattern information relating to feed and read out from said static memory 1.

(4) Feed-oriented lower position data register F-DATA$_l$.

An area for temporarily storing the lower 4-bit portion of pattern information relating to feed and read out from said static memory 1.

(5) Bight-oriented higher position address register B-ADR$_h$.

An area for temporarily storing the higher 4-bit portion of an address signal for the data to be subsequently transferred on the basis of an instruction word represented by the higher 3-bit portion of order instruction data relating to bight and read out from said static memory 1.

(6) Bight-oriented lower position address register B-ADR$_l$.

An area for temporarily storing the lower 4-bit portion of an address signal for the data to be subsequently transferred on the basis of an instruction word represented by the higher 3-bit portion of order instruction data relating to bight and read out from said static memory 1.

(7) Feed-oriented higher position address register F-ADR$_h$.

An area for temporarily storing the higher 4-bit portion of an address signal for the data to be subsequently transferred on the basis of an instruction word represented by the higher 3-bit portion of order instruction data relating to feed and read out from the static memory 1.

(8) Feed-oriented lower position address register F-ADR$_l$.

An area for temporarily storing the lower 4-bit portion of an address signal for the data to be subsequently transferred on the basis of an instruction word represented by the higher 3-bit portion of order instruction data relating to feed and read out from the static memory 1.

(9) Control flip-flop CONT·FF.

An area set as a flip-flop for effecting control such that depending upon a change in its state, the indexing of pattern signals is started with the timing (in synchronism with bight) that the sewing machine needle initially draws out of the throat plate after the selection of a pattern, while ensuring that bight and feed movements are repeatedly effected.

(10) Bight-oriented inverter flip-flop B-INV·FF.

An area set as a flip-flop which, depending upon a change in its state, designates either addition or subtraction in the step of adding 1 to or subtract 1 from the address signal stored in said bight-oriented address register.

(11) Feed-oriented inverter flip-flop F-INV·FF.

An area set as a flip-flop which, depending upon a change in its state, designates either addition or subtraction in the step of adding 1 to or subtracting 1 from the address signal stored in said feed-oriented address register.

(12) End flip-flop END·FF.

An area set as a flip-flop for effecting control such that at the start of pattern stitching, the head address data for the specified pattern information stored in the head area of said static memory 1 is reliably stored in the bight-oriented data registers B-DATA$_h$, B-DATA$_l$ and in the feed-oriented data registers F-DATA$_h$, F-DATA$_l$.

(13) Pattern code register.

An area for temporarily storing a pattern code corresponding to a particular pattern selection instruction received as converted into a binary signal.

(14) Bight-oriented status counter B-SC.

An area for temporarily storing a signal relating to the number of repetitions of the same bight movement which is to be repeatedly effected on the basis of the order instruction data read out from the static memory 1.

(15) Feed-oriented status counter F-SC.

An area for temporarily storing a signal relating to the number of repetitions of the same feed movement which is to be repeatedly effected on the basis of the order instruction data read out from the static memory 1.

The microcomputer 2 used as the control system has an input port A connected to an encoder 4 which converts into a binary signal a pattern selecting instruction sent from a pattern selecting button unit 3, and an input port B connected to a timing pulse generating unit 5 whereby a bight-synchronous signal $B_0$ which is to be generated with the timing that the sewing machine needle is drawn out of the fabric and a feed-synchronous signal $B_1$ which is to be generated with a timing convenient for the conversion of the feed of the fabric, i.e., the timing that the feed dog comes below the throat plate surface are alternately generated in timed relation to the rotation of the sewing machine main shaft. The microcomputer 2 has output ports E and F connected to the input side of said static memory 1 in such a manner that the higher 4-bit portion and lower 4-bit portion of an 8-bit address signal for reading out the information stored in the static memory 1 are separately sent out through the ports E and F, respectively. Further, the microcomputer 2 has input ports C and D connected to the output side of the static memory 1 in such a manner that the higher 4-bit portion and lower 4-bit portion of an 8-bit data to be read out are separately read out at the ports C and D, respectively.

In this embodiment, the microcomputer which is capable of receiving and sending out only a 4-bit signal at a time is used as the control system and each 8-bit signal has to be transferred as divided into the higher and lower 4-bit portions, as described above. Therefore, of the pattern information to be stored in said static memory 1, the output-oriented data which actually provides the displacement of the needle or the feed of the feed dog and which would otherwise be represented by, e.g., (00010110) has its lowest bit LSB transposed to the 4th position as numbered from the highest position to provide (00001011) which is then stored in the static memory 1, so that when the 5 bits in the lower position of the output-oriented data which is the substantial output signal in this embodiment are transferred, the LSB, which has less effect, is separated from the other 4 bits. Thus, the 4-bit portion, or (1011) in the case of the above example of the signal, of the bight-oriented data is transferred through the output port H of the microcomputer 2 and the remaining LSB is transferred through one terminal $I_0$ of another output port I, while the 4-bit portion of the feed-oriented data is transferred through the output port G and the remaining LSB is transferred through the other terminal $I_1$ of the output port I. Although such 8-bit signal is transferred as divided into two 4-bit portions, actually it is controlled at substantially the same speed as if it were transferred as a whole. Therefore, it is not always necessary to transpose the LSB in storing the output-oriented data in the static memory 1.

It has been previously stated that of the pattern information to be stored in the static memory 1, the higher 3-bit portion of the order instruction data is (100), (101), (110) or (111), each indicating a different order instruction. A detailed description thereof will now be given below.

(a) Jump instruction JMP represented by (110).

The lower 4-bit portion (DATA$_l$) of the data read out from the static memory is either added to or subtracted from the address signal stored in the address registers B-ADR$_h$, B-ADR$_l$ or F-ADR$_h$, F-ADR$_l$ and the result is delivered through the ports E and F. Whether the operation should be addition or subtraction depends on whether the 4th bit in the higher 4-bit portion (100X) of the order instruction data is (1) or (0).

(b) Inversion instruction INV represented by (101).

The state of the inverter flip-flop B-INV·FF or F-INV·FF prepared in the RAM is reversed like $1 \rightleftarrows 0$ and the lower 4-bit portion (DATA$_l$) of the data read out from the static memory 1 is added to or substracted from the address signal ADR stored in the address register, the result being transferred to the ports E and F. Whether the operation should be addition or subtraction depends on whether the 4th bit in the higher 4-bit portion (101X) of the order instruction data is (1) or (0).

(c) Conditional jump instruction CJP represented by (110).

One is substracted from the count of the status counter B-SC or F-SC prepared at the RAM. If there is no borrow (which means that the count of the status counter is 1 or above), the lower 4-bit portion (DATA$_l$) of the data read out from the static memory 1 is added to or subtracted from the address signal ADR stored in the address register and the result is transferred to the ports E and F, while if there is borrow (which means that the count of the status counter is 0), 1 is added to the ADR, the result being transferred to the ports E and F. Whether the operation should be addition or subtraction depends on the state of the inverter flip-flop INV·FF.

(d) Set instruction SET represented by (111).

The lower 4-bit portion (DATA$_l$) of the data read out from the static memory 1 is stored in the status counter B-SC or F-SC prepared at the RAM and 1 is added to the address signal ADR stored in the address register, the result being transferred to the ports E and F.

Figure 2:
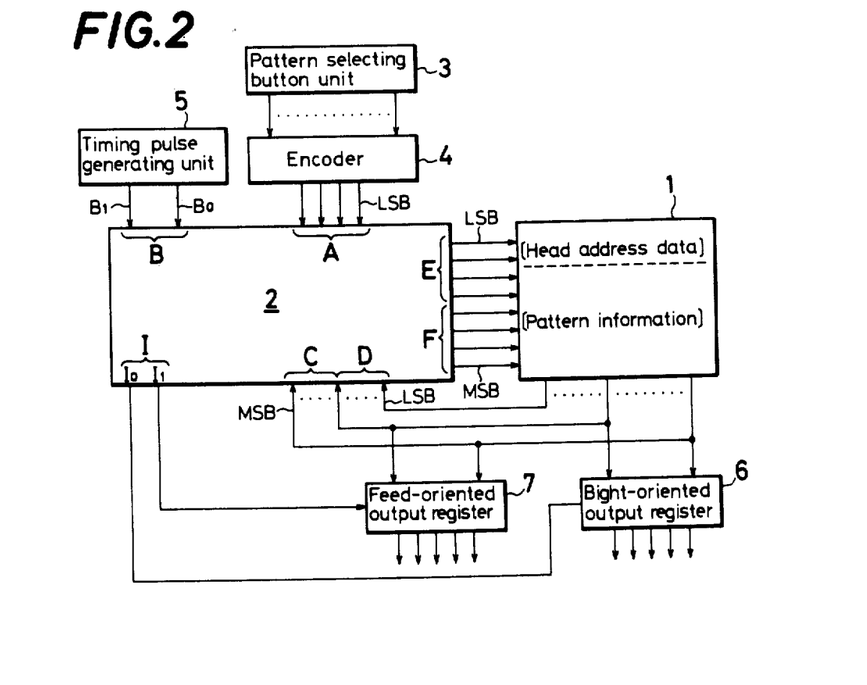
FIG. 2 is a block diagram illustrating another embodiment of the invention.

The embodiment shown in FIG. 1 has been so arranged that after data read out from the static memory 1 is once stored in the RAM in the microcomputer 2, the output-oriented data is transferred through the output ports G, H and I. However, as shown in FIG. 2, it is also possible to provide bight-oriented and feed-oriented output registers 6 and 7 outside the microcomputer 2 for latching the 5-bit portion of the output data from the static memory 1, so that if the data read out from the static memory 1 is found to be output-oriented data by a decision-making operation, the port I of the microcomputer 2 emits latch signals which are then temporarily stored.

In the case of the embodiment shown in FIG. 1, the microcomputer 2 has built therein a program shown by flowcharts in FIGS. 3 through 10, and pattern stitching will be performed by control operations described below.

Figure 4:
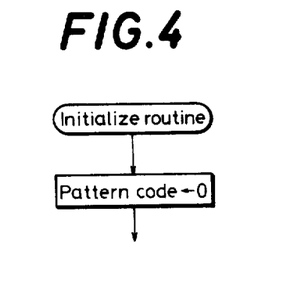
FIG. 4 is a flowchart which details an initialize routine in FIG. 3.

(1) When the power is turned on, the microcomputer 2 first executes an initialize routine which resets the pattern code register prepared at the RAM, as shown in FIG. 4. Next, its resets the control flip-flop CONT·FF, inverter flip-flop INV·FF, status counter SC, address register ADR, data register DATA, and end flip-flop END·FF, all being set at the RAM of the microcomputer 2.

Figure 3:
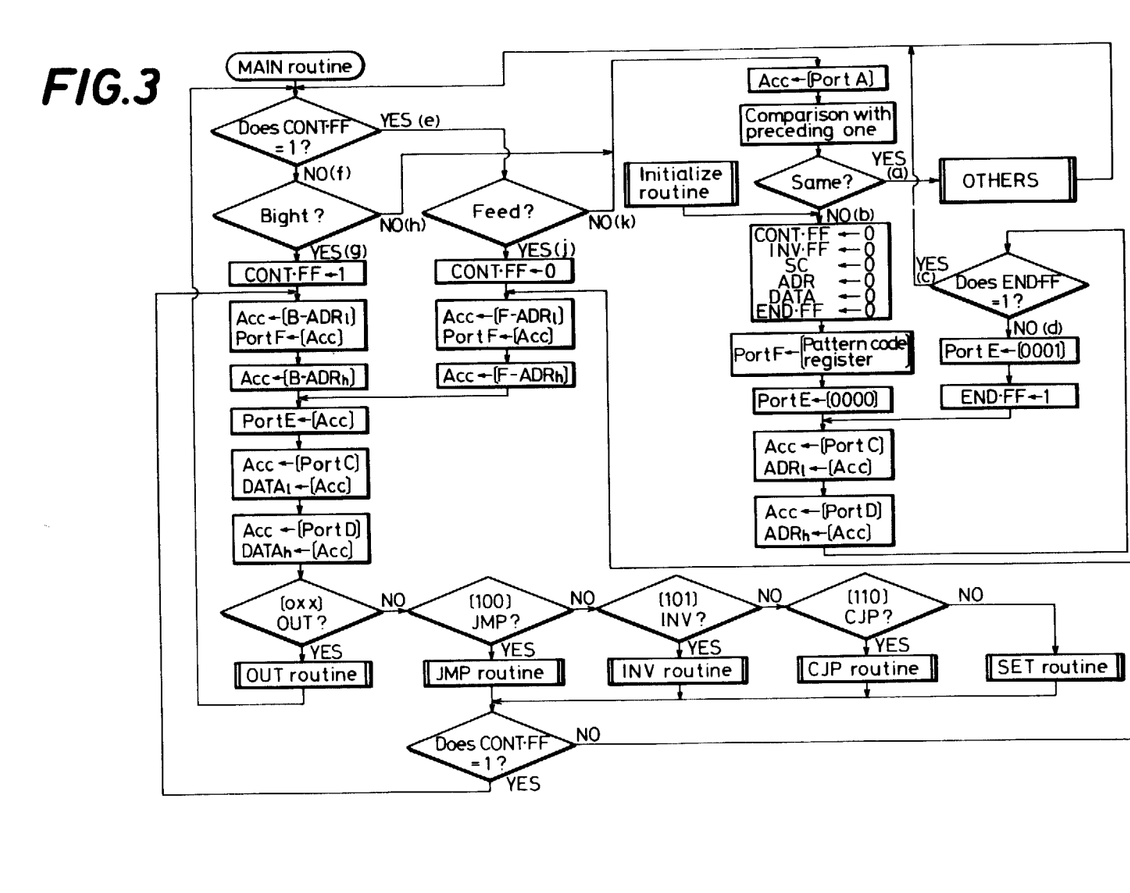
FIG. 3 is a flowchart which outlines a program for data read-out control placed into a microcomputer in the embodiment shown in FIG. 1.

(2) In the step where no buttons on the pattern selecting unit 3 are depressed, the pattern code register transfers (0000) to the port E and (0000) to the port F, and the data relating to the bight for straight stitch and stored at the address (00000000) of the static memory 1 is dividedly read out with its lower 4-bit portion at the port C and its higher 4-bit portion at the port D and, after being once taken into the accumulator (Acc), the portions are stored in the bight-oriented address registers B-ADR$_l$ and B-ADR$_h$, respectively.

Since the end flip-flop END·FF is in the reset state, the program entering the next decision step flows in the direction d, resulting in (0001) being transferred to the port E and the end flip-flop END·FF being set to (1), and the data stored at the address (00000001) of the static memory 1 and relating to the feed for straight stitch is read out at the ports C and D and stored in the feed-oriented address registers F-ADR$_l$ and F-ADR$_h$.

Since the end flip-flop END·FF has been previously set to (1), the program entering the decision step "Does END·FF=1?" flows in the direction c and, with the sewing machine at a stop now, it flows along f and h into the decision step of comparing the contents taken in from the port A with the stored contents of the pattern code register. Since the stored contents of the pattern code register and the contents taken in are both (0000), the program flows in the direction a into other routines, the above decisions being then repeated.

(3) When the predetermined button on the pattern selecting button unit 3 is depressed, a pattern selecting instruction is issued, which is converted into a predetermined pattern code represented as a binary 4-bit signal by the encoder 4 and is transferred to the input port A of the microcomputer 2.

The pattern code transferred to the port A is once stored in the accumulator Acc of the microcomputer 2 with a certain timing and is compared with the contents of the pattern code register of the RAM upon execution of the initialize routine.

Since the present contents of the pattern code register of the RAM is (0000), the program flow in the direction b and the pattern code in the accumulator Acc is newly stored in the pattern code register of the RAM.

(4) The contents of the pattern code register, i.e., the previous pattern code is first transferred to the port F and (0000) is then transferred to the port E. The head address data relating to the bight for the selected stitch pattern stored in the static memory 1 is read out at the input ports C and D and, after being once taken into the accumulator Acc, it is stored in the bight-oriented address registers B-ADR$_l$ and B-ADR$_h$.

Since the end flip-flop END·FF is now in the reset state, the program entering the next decision step flows in the direction d to provide (0001) at the port E. After the end flip-flop END·FF is set to (1), the head address data relating to the feed for said selected pattern is read out at the input ports C and D and, after being once taken into the accumulator Acc, it is stored in the feed-oriented address registers F-ADR$_l$ and F-ADR$_h$.

(5) Since the end flip-flop END·FF has been previously set to (1), the program entering the decision step "Does END·FF=1?" flows in the direction C and the head address data for the specified stitch pattern is reliably stored in the address registers B-ADR$_l$, B-ADR$_h$, F-ADR$_l$ and F-ADR$_h$.

(6) Since the control flip-flop CONT·FF has been reset during the previous execution, upon the rotation of the sewing machine the program entering the decision step "Does CONT·FF=1?" flows in the direction f to the decision step "Bight?" which determines whether or not there is a bight-synchronous signal B$_0$ to the input port B, and hence execution is started with the indexing of pattern relating to bight.

Upon confirmation of the bight-synchronous signal B$_0$, the program flows in the direction g, setting the control flip-flop CONT·FF to (1), and the head address data relating to bight for the specified stitch pattern and stored in the bight-oriented address registers B-ADR$_l$ and B-ADR$_h$ is transferred to the ports E and F, updating the address designation for the static memory 1.

(7) The output from the static memory 1 is then stored in the bight-oriented data registers B-DATA$_l$ and B-DATA$_h$.

(8) Depending on whether the higher 3-bit portion of the output from the static memory 1 is (0XX), (100), (101), (110) or (111), an OUT routine, JMP routine, INV routine, CJP routine or SET routine is executed in the next step. After the execution of the routines other than the OUT routine, the execution of the above is repeatedly effected until output-oriented data is encountered via the decision step "Does CONT·FF=1?". After the OUT routine is executed, the program flows back to the previous decision step "Does CONT·FF=1?". Since the control flip-flop CONT·FF has already been set to (1), the program flows in the direction e.

(9) When the feed-synchronous signal B$_1$ is transferred to the input port B, the program entering the decision step "Feed?" flows in the direction j. After the control flip-flop CONT·FF of the RAM is reset, the head address data relating to the feed for the designated pattern and previously stored in the address registers F-ADR$_l$ and F-ADR$_h$ is transferred to the ports E and F, updating the address designation for the static memory 1.

(10) The output data from the static memory 1 is stored in the feed-oriented data registers F-DATA$_l$ and F-DATA$_h$. As in the execution described in the paragraph (8), one of such routines as the OUT routine, JMP routine, INV routine, CJP routine and SET routine is executed and the above cycle is repeated until the output-oriented data is encountered.

(11) As a result of the execution of the phases described in the paragraphs (6) through (10), the output-oriented data is encountered and the program entering the decision step "Does CONT·FF=1?" flows in the direction f and the sequence relating to bight is executed again. Thereafter, the sequences relating to bight and feed, respectively, are alternately executed.

(6'), (7'), (8'), (9'), (10'), (11').

In the execution of the phases of the program in the paragraphs (6) through (11), if the sewing machine is rotated without depressing the button on the pattern selecting button unit 3, the OUT routine will be executed without fail in the execution of (10) and the straight stitch operation will be repeated.

Figure 5:
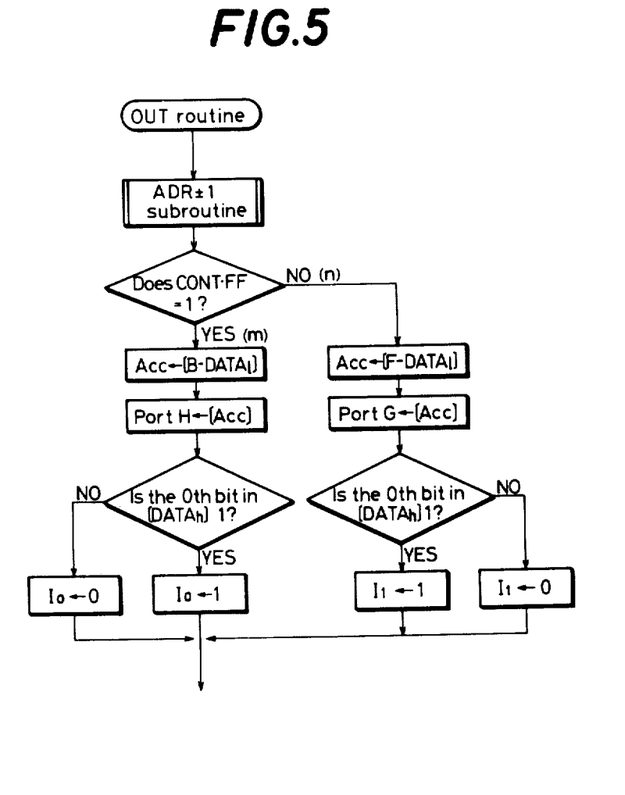
FIG. 5 is a flowchart which details an OUT routine in FIG. 3.
Figure 6:
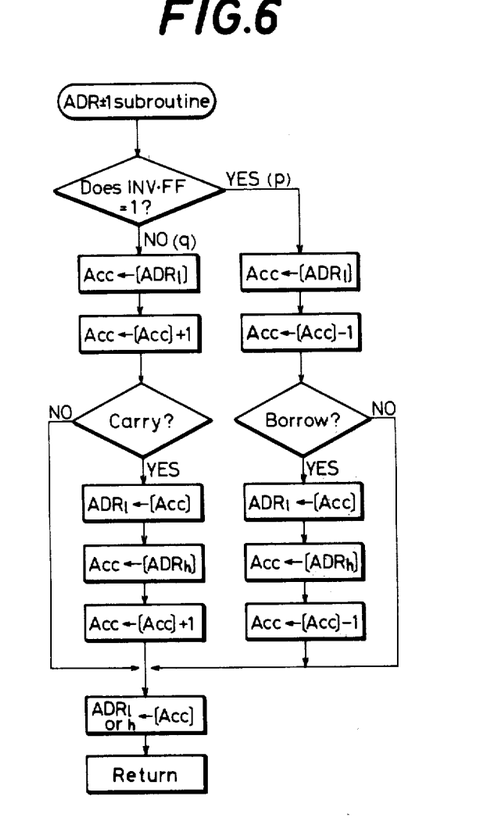
FIG. 6 is flowchart which details an ADR±1 sub-routine in FIG. 5.

(12) In the OUT routine which is executed when the higher 3-bit portion of the data read out from the static memory 1 is (0XX), as shown by a flowchart in FIG. 5, the ADR±1 subroutine adds 1 to or subtracts 1 from the pattern address data stored in the address registers B-ADR$_l$, B-ADR$_h$ or F-ADR$_l$, F-ADR$_h$ and then the decision step "Does CONT·FF=1?" decides on whether the next execution relates to bight (when CONT=1) or to feed (when CONT=0). The program flows in the direction m if it relates to bight and in the direction n if it relates to feed. In the case of execution relating to bight, the contents of the bight-oriented lower position data register B-DATA$_l$ is transferred to the port H while the 4th bit of the contents of the bight-oriented higher position data register B-DATA$_h$ (which 4th bit corresponds to the lowest bit LSB in the bight data to be transferred) is transferred to the terminal I$_0$ of the port I. Thus, 5-bit pattern information relating to bight is transferred. In the case of execution relating to feed, the contents of the feed-oriented lower position data register F-DATA$_l$ is transferred to the port G while the 4th bit of the contents of the feed-oriented higher position data register F-DATA$_h$ (which 4th bit corresponds to the lowest bit LSB in the feed data to be transferred) is transferred to the terminal I$_1$ of the port I. Thus, 5-bit pattern information relating to feed is transferred.

In the ADR±1 subroutine described above, as shown by a flowchart in FIG. 6, in the decision step "Does INV·FF=1?", whether the program flows in the direction q where 1 is added to the address data or in the direction p where 1 is subtracted from it is determined according to whether the state of the inverter flip-flop INV·FF of the RAM is (0) or (1). In the case of addition, if there is carry caused by adding 1 to the contents of the lower position address register B-ADR$_l$ or F-ADR$_l$, 1 is also added to the contents of the higher position address register B-ADR$_h$ or F-ADR$_h$ to update the address data, but if there is no carry, address updating is completed by simply adding 1 to the contents of the lower position address register B-ADR$_l$ or F-ADR$_l$. In the case of subtraction, if there is borrow caused by subtracting 1 from the contents of the lower position address register B-ADR$_l$ or F-ADR, 1 is also subtracted from the contents of the higher position address register B-ADR$_h$ or F-ADR$_h$ to update the address data, but if there is no borrow, the address updating is completed by simply subtracting 1 from the contents of the lower position address register B-ADR$_l$ or F-ADR$_l$.

Figure 7:
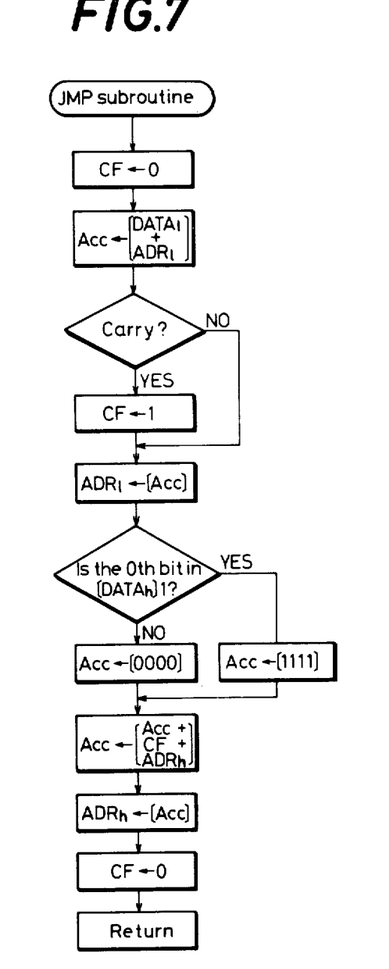
FIG. 7 is a flowchart which details a JMP routine in FIG. 5.

(13) In the JMP routine which is executed if the 3 bits in the higher portion of the data read out from the static memory 1 are (100), as shown by a flowchart in FIG. 7, the lower 5-bit portion of the data read out from the static memory 1 is added to or subtracted from the address signal now stored in the address register to provide for a jump to the predetermined address.

If the highest of the 5 bits in the data read out (i.e., the lowest bit in the data stored in the higher position data register B-DATA$_h$ or F-DATA$_h$) is 0 as when the data is (1000AAAA), a jump is made to the present address +(0000AAAA), while if the highest of the 5 bits in the data is 1 as when the data is (1001A'A'A'A'), a jump is made to the present address +(1111A'A'A'A'), the result being transferred to the ports E and F. Since (A'A'A'A') indicates the complement of the value to be subtracted from the address of said data (1001A'A'A'A'), it follows that a jump is made to the address which results from subtraction from the present address.

Figure 8:
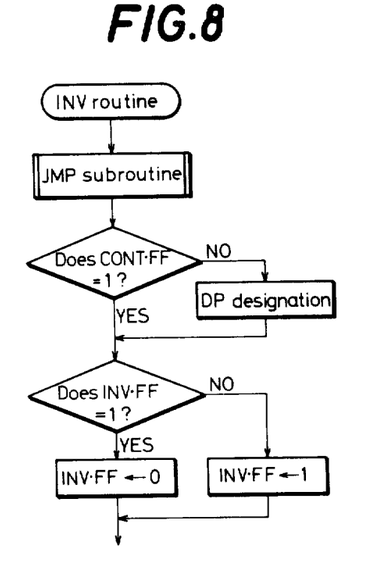
FIG. 8 is a flowchart which details an INV routine in FIG. 3.

(14) In the INV routine which is executed if the 3 bit in the higher position of the data read out from the memory 1 are (101), as shown by a flowchart in FIG. 8, the JMP subroutine is first executed and the address signal for the address register jumps from the present address to another address. If the phase of the program being executed relates to bight, the state of the bight-oriented inverter flip-flop B-INV·FF is inverted from (0) to (1) or from (1) to (0), while if it relates to feed, the state of the feed-oriented inverter flip-flop F-INV·FF is inverted from (0) to (1) or from (1) to (0). Thus, in the execution of the ADR±1 subroutine which adds 1 to or subtracts 1 from the present address, whether the operation to be performed should be addition or subtraction is determined.

Figure 9:
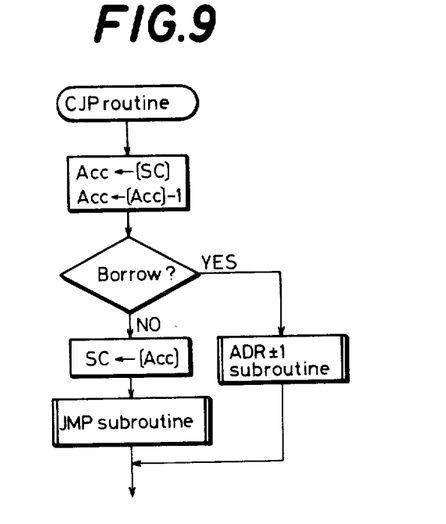
FIG. 9 is a flowchart which details a CJP routine in FIG. 3.

(15) In the CJP routine which is executed if the 3 bits in the higher position of the data read out from the static memory 1 are (110), as shown by a flowchart in FIG. 9, 1 is subtracted from the contents of the status counter B-SC or F-SC. If this subtraction causes borrow, i.e., if said contents prior to subtraction is 0, the ADR±1 subroutine is executed and the address signal for the address register jumps to the present address±1. If there is no borrow caused, i.e., if said contents prior to subtraction is not 0, the address signal for the address register jumps from the present address to another address.

For example, if the data read out from the static memory 1 is (1100AAAA), a jump is made to the present address ±1 if the count of the status counter B-SC or F-SC is 0 or to the present address +(AAAA) address if it is not 0, and 1 is subtracted from the count of the status counter.

Further, if the data read out is (1101A'A'A'A'), a jump is made to the present address +1 address if the count of the status counter B-SC or F-SC is 0 or to the present address +(1111A'A'A'A') address, i.e., to an address which is obtained by subtracting from the present address the value corresponding to the complement representation (A'A'A'A'), and 1 is subtracted from the count of the status counter.

Figure 10:
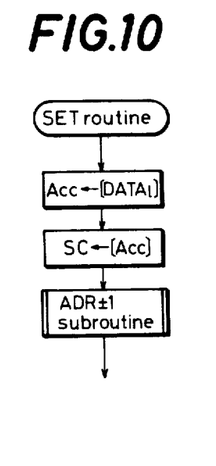
FIG. 10 is a flowchart which details an SET routine in FIG. 3.

(16) In the SET routine which is executed if the 4 bits in the higher position of the data read out from the static memory 1 are (111X), as shown by a flowchart in FIG. 10, the 4 bits (DATA$_l$) in the lower position of the data read out are stored in the status counter B-SC or F-SC of the RAM and the address signal ADR has 1 added thereto for a jump to the present address +1 address.

Figure 12:
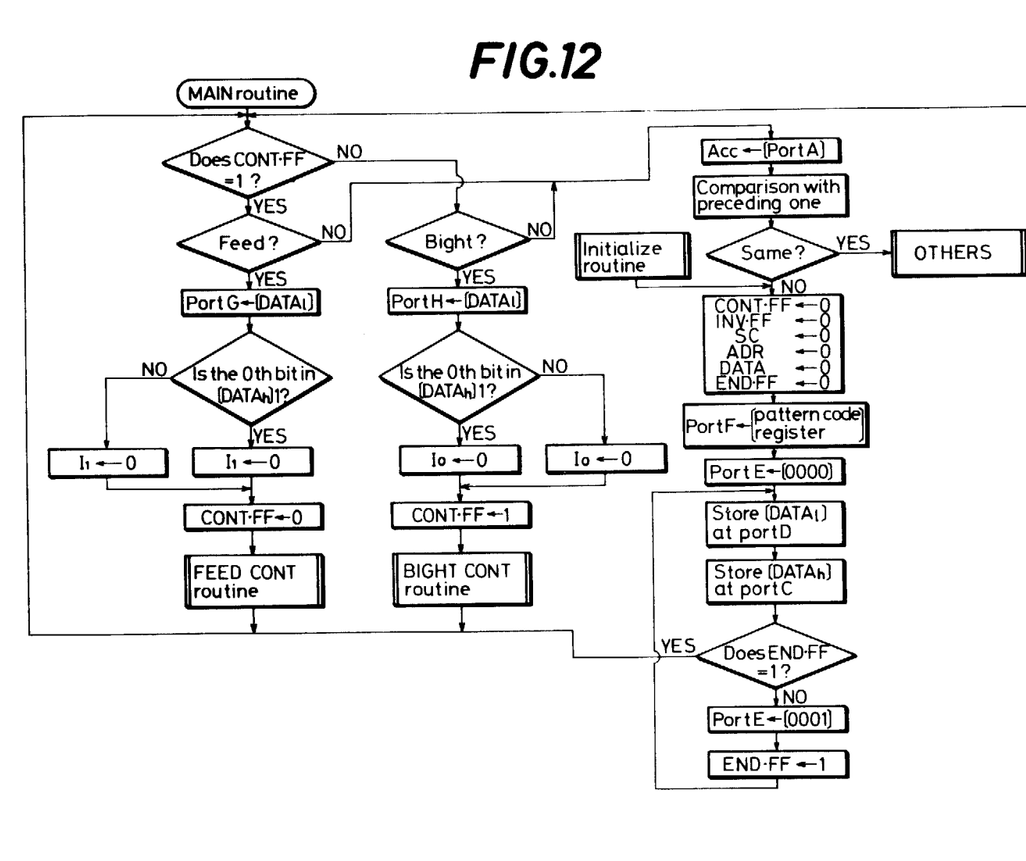
FIG. 12 is a flowchart which outlines another program to be employed in the embodiment shown in FIG. 1.
Figures 13, 14:
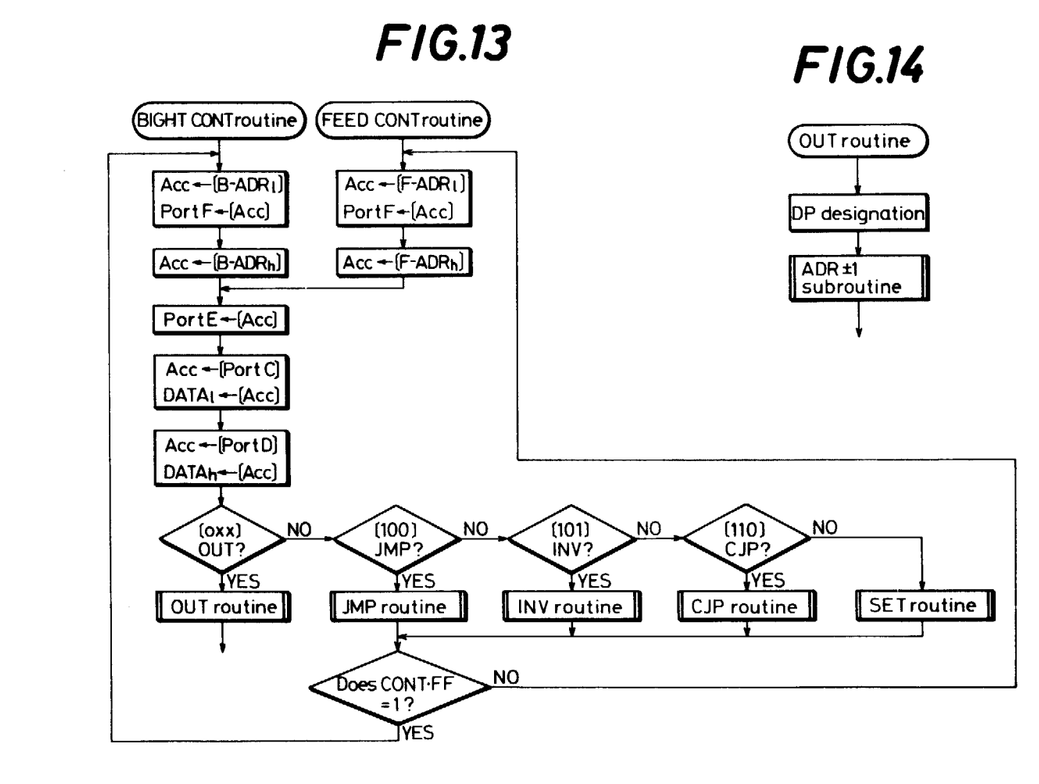
FIG. 13 is a flowchart which outlines a BIGHT CONT routine and a FEED routine in FIG. 12.
FIG. 14 is a flowchart which details an OUT routine in FIG. 12.

Flowcharts shown in FIGS. 12 through 14 illustrate a case where the control of indexing of pattern stitch information from the static memory 1 is effected by a program different from the one described above. Whereas the above-described program is so arranged that before receiving a bight-synchronous signal $B_1$ from the timing pulse generating unit 5, a sequence is executed for indexing from the static memory 1 data to be transferred during that synchronous cycle, this program is so arranged that data to be transferred during the next synchronous cycle is indexed before receiving a signal from the timing pulse generating unit 5 and that upon receipt of a bight-synchronous signal $B_0$ or feed-synchronous signal $B_1$, the transfer of data is effected.

Figure 11:
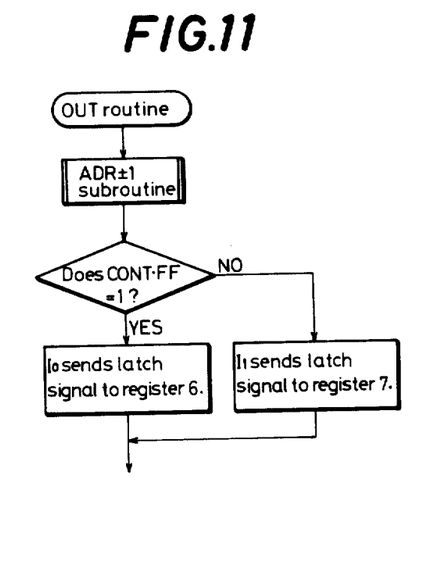
FIG. 11 is a flowchart which details the OUT routine in FIG. 3 but which is modified for use in the embodiment shown in FIG. 2.

In the embodiment shown in FIG. 2, the OUT routine described in the paragraph (11) is arranged as shown in FIG. 11, wherein subsequent to the execution of the ADR±1 subroutine it is determined whether the next execution relates to bight or feed; if it relates to bight, a latch signal is sent from the terminal $I_0$ of the port I to the bight-oriented output register 6 and the output data is stored in said register, while if it relates to feed, a latch signal is sent from the terminal $I_1$ of the port I to the feed-oriented output register 7 and output data is stored in said register.

It will be understood from what has been described so far that the pattern generating system for electric sewing machines according to the present invention is so arranged that not only are the data relating to the bight movement of the needle and the data relating to the feed movement of the feed dog stored separately in the static memory but also the data relating to the address at which the head data of a particular program for pattern stitching is stored at a particular specified address in said static memory addressed by a particular selecting instruction sent from the pattern selecting button unit and that the static memory and the control system for reading out data from the static memory are independent of each other without being restrained in unseparable relation with respect to the pattern information to be stored, so that it is possible to exchangeably mount several kinds of static memories having different programs stored therein to provide the electronic sewing machine with the same exchange function as that of the exchange cam type selection means employed in a conventional sewing machine designed to mechanically perform pattern stitching. Thus, the system is very economical in that from the standpoint of the user it is possible to demand only a static memory having required pattern programs stored therein while from the standpoint of the manufacturer it is possible to meet the user's demand for simply supplying a static memory having those pattern programs stored therein.

What is claimed is:

1. A pattern generating system for use in an electronic sewing machine comprising a static memory for storing data relating to the bight movement of the needle and to the feed movement of the feed dog, a drive unit which controls the amount and direction of bight and feed of the sewing machine so as to perform pattern stitching, means for applying the data stored in the static memory to the drive unit to control sewing machine pattern stitching, said system being characterized in that output-oriented data relating to the amount of bight or feed for a stitch pattern and order instruction-oriented data relating to the order in which said output-oriented data is read out are stored in the static memory separately in such a manner as to distinguish between the data relating to bight and the data relating to feed, data relating to the address at which the respective head data on stitch patterns is stored being stored at specified addresses in said static memory addressed by selection instructions corresponding to said stitch patterns given as by a pattern selecting button unit, and means connecting said static memory to a microcomputer which performs a control operation such that it indexes said static memory, analyzes said order instruction-oriented data and updates addresses or gives said output-oriented data to the drive unit, said connection of said static memory to said microcomputer being such that said static memory can be exchanged with another static memory having stored therein data relating to other different stitch patterns.

* * * * *